P. C. HEWITT.
SYSTEM OF TRANSFORMING ENERGY.
APPLICATION FILED OCT. 29, 1915.
1,409,717.
Patented Mar. 14, 1922.
2 SHEETS—SHEET 1.
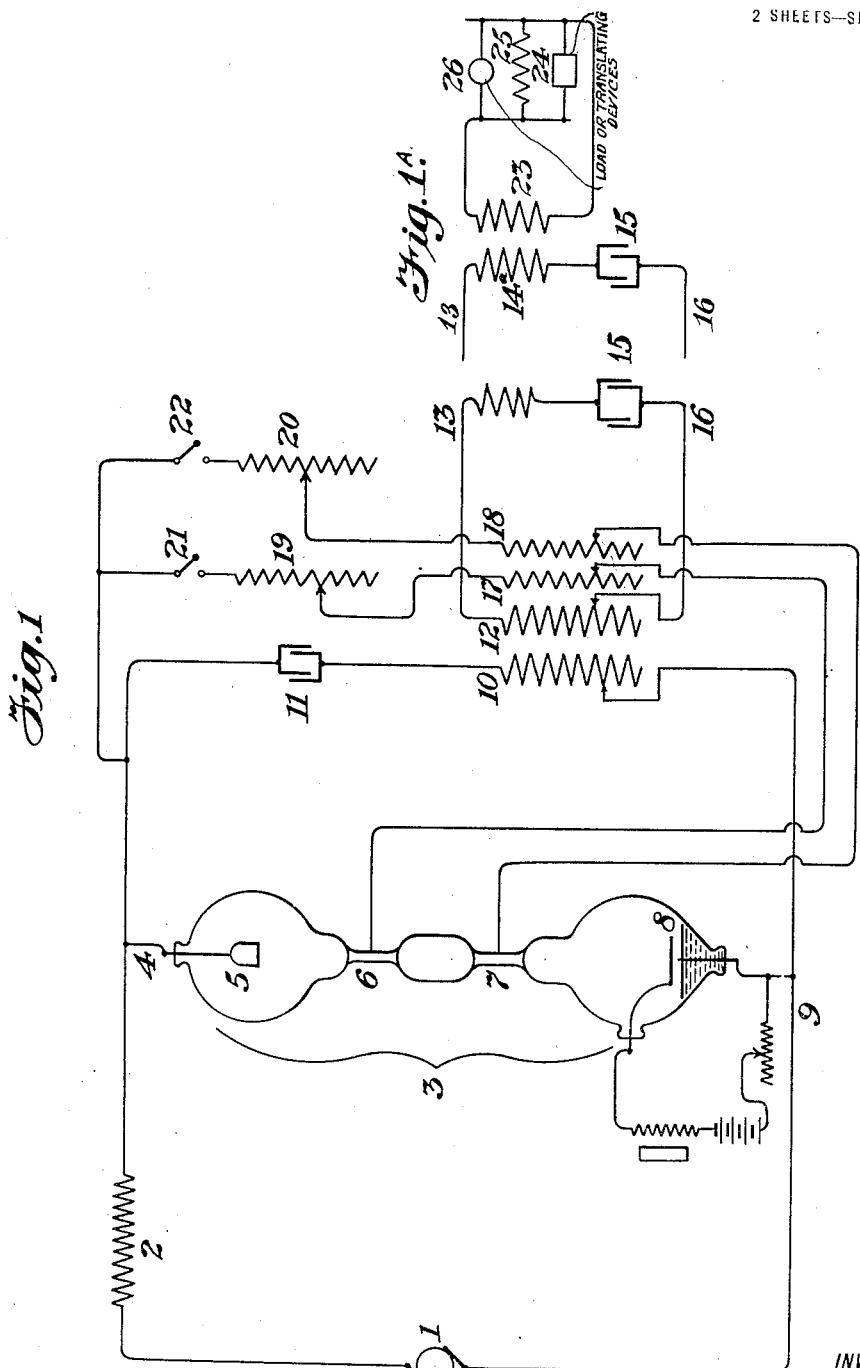
INVENTOR
Peter Cooper Hewitt
BY
ATTORNEY

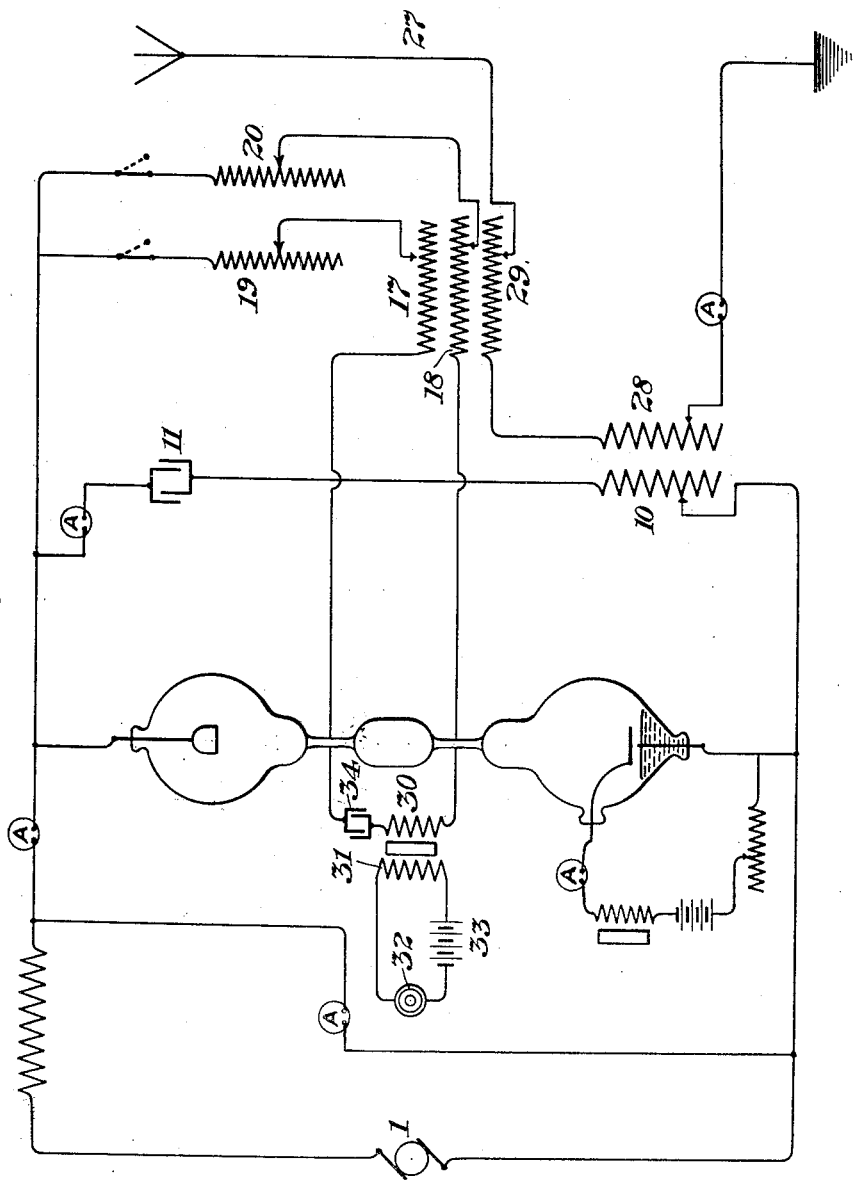

UNITED STATES PATENT OFFICE.

PETER COOPER HEWITT, OF RINGWOOD MANOR, NEW JERSEY.

SYSTEM OF TRANSFORMING ENERGY.

1,409,717.  Specification of Letters Patent.  Patented Mar. 14, 1922.

Application filed October 29, 1915. Serial No. 58,594.

*To all whom it may concern:*

Be it known that I, PETER COOPER HEWITT, a citizen of the United States, and resident of Ringwood Manor, county of Passaic, State of New Jersey, have invented certain new and useful Improvements in Systems of Transforming Energy, of which the following is a specification.

The object of my invention is to provide means and apparatus for supplying energy to an oscillating system of such nature and in such manner that the energy will be accumulated or stored until such an amount is reached that the energy thereafter radiated and dissipated will equal the energy received while there remains in store accumulated energy of an approximately constant amount.

The general plan of the invention consists in supplying energy from one system serving as a source to a second system acting as a radiator and causing the energy to be delivered from the first system to the second and preventing energy from being delivered from the second system back to the first, although the second system is capable of receiving energy from the first and utilizing energy by means of the second system.

The invention consists in producing discontinuous energy flow or energy pulses in a system in one direction, transferring the energy to a second system, which second system is an oscillating system permitting energy to act in both directions, and capable of containing kinetic oscillating energy, causing the time duration of the pulse and time of starting of the pulse to bear a definite relation to the time period of the oscillating system, and in causing the pulse of the first system to act in definite phase relation with the oscillations of the second system as related to the degree of couple between the two systems, and in causing the first system to prevent energy transfer from the second system to it, a barrier being presented to energy in one direction.

The invention further consists in continuously maintaining energy in the oscillating system in excess of the energy being currently supplied to it and in supplying the energy intermittently and in causing variations of energy in the system by varying the amount of energy supplied and, consequently, the amount of energy radiated and dissipated.

The invention also comprises the maintenance of a continuous intermittent supply of energy, and varying the radiation of the system by varying the internal consumption or dissipation of the system, and also varying the amount of energy radiated by varying the receptiveness of the system as regards energy from the source.

The invention consists in transferring practically all the energy received from the source by the first system to the second system in two circuits having commensurate electrical conditions by the adjustment of the time of starting of the pulse, the time of duration of the pulse, with relation to the phase of the oscillation in the second system and the degree of mutual magnetic interlinkage existing between the two circuits, and further in controlling the amount of energy received by the first circuit by the consumption characteristics of the second circuit.

A convenient means of illustrating and explaining my invention is by means of its application to electrical systems.

A source of direct electrical current and a circuit, including a vapor device, is used, such, for instance, as described in my pending application filed March 18th, 1915, Serial Number 15,267. A pulsator, so-called, is placed in shunt to a circuit having capacity and inductance, and a second circuit is in inductive relation to the first named circuit, the second circuit being an oscillating circuit comprising a capacity, resistance, and inductance. This is the consumption circuit, either by reason of energy radiated as electromagnetic waves, or consumed by resistance, or otherwise dissipated.

By means of the first named circuit and its control, electric pulses may be produced of a time period, duration, and energy value desired. The energy of the pulses in this circuit is transferred to the second or oscillatory circuit by means of the mutual interlinkage of inductances of the two circuits.

I have found that by suitable adjustment of the rate of the pulse, its time of starting and duration in relation to the time and phase of the oscillatory circuit and by suitable adjustment of the inductive interlinkage of the two circuits, the energy of the first or pulse circuit may be continuously transferred to the second or oscillatory circuit, even though the oscillator circuit has a greater energy flow per unit of time than the pulse circuit, and that energy in the oscillator circuit may be prevented from being returned and consumed in the pulse circuit.

By means of my invention it becomes possible to energize intermittently without cessation an aerial and cause oscillating energy to be continuously present in its circuit much in excess of the energy being radiated, the energy in the supply circuit being substantially equal to the energy dissipated by the aerial circuit.

In practice, by means of the pulsator, the intermittent delivery of energy and the correlation of the electric factors of the circuit, energy may be efficiently and continuously delivered to an aerial and the oscillations continuously maintained; and while in continuous operation the energy radiating value may be varied with such delicacy as to reproduce speech at a receiving station, even though the per cent variations be but a small per cent of the energy flow in the aerial circuit.

In the accompanying drawings, by way of illustration of the invention, I have shown, in Figure 1, a pulsator system serving as a source and supplying energy to a closed oscillatory circuit; Figure 1ª shows a load circuit connected to the system of Figure 1 and Figure 2 shows an arrangement similar to Figure 1 in which an aerial is substituted for the closed oscillatory circuit of that figure.

Referring to the drawings, a source of direct current is indicated at 1. A conductor, including an inductance, 2, leads to a vapor device, 3, by way of a conductor, 4, leading to a positive electrode, 5. The vapor device I have termed a "pulsator." The pulsator is provided with conductors, 6 and 7, electrically communicating with the interior of the device, and the negative electrode, 8, is connected by way of a conductor, 9, to the source 1. The pulsator is affected and controlled by means of the circuits including resistance 19 and inductance 17, connected from the conductor leading to the positive electrode 5 to the conductor 6 and by similar resistance and inductance and connections, as indicated at 20, 18 and 7. In shunt to the pulsator there is another circuit comprising the lead 4, capacity 11, inductance 10, and conductor 9. In inductive relation to the inductance 10 there is another inductance, 12, included in an oscillatory circuit consisting of the conductor, 13, inductance 14, capacity 15, and conductor 16.

In general, the operation is as follows. The negative electrode reluctance of the electrode 8 of the pulsator 3 having been broken down and being continuously maintained in that condition, by the keep alive circuit, current is fed from the source 1 to the condenser 11. When the charge in the condenser 11 reaches a value sufficient to start current flow between the electrodes 5 and 8 of the pulsator 3, it discharges through the pulsator 3 and through the inductance 10 in circuit therewith. This is the first system, or pulse circuit.

As soon as the condenser has discharged through the pulsator 3, the initial reluctance to starting of current therethrough is re-established and maintained and controlled by the conductors 6 and 7 and their electrical connections, and as the device is inherently a unidirectional one, a barrier is always presented to current flow in the opposite direction and intermittently in the same direction and thus a return of energy from the oscillating to the pulse circuit is prevented at any time. This immediate establishment of the initial starting reluctance also prevents the discharge of the condenser until it is fully charged to the initial high voltage.

The discharge of the condenser 11 through the inductance 10 sets up oscillations in the second system, or oscillatory circuit, 12, 13, 14, 15 and 16 of Figure 1, or 28, 29 and 27 of Figure 2, in a manner now well understood.

The conductors 6 and 7 of the pulsator 3 affect the starting reluctance of the pulsator and this starting reluctance is varied by the action of the oscillations of the oscillatory circuit on the coils 17 and 18, in the circuits of said conductors 6 and 7, which are in inductive relation with the coil 12 of Figure 1 or 29 of Figure 2, and by these means the pulse may be timed and the proper phase relation be obtained for energy transfer. Meanwhile, the condenser 11 is being charged from the source 1, and when the charge therein has reached a proper value, it will be discharged through the pulsator 3 and the inductance 10 at the right time and with the proper phase relation to the current in the oscillatory circuit.

In practice, I have found that the first pulse created by the pulsator circuit, the energy of which is transferred through the inductance 10 to the inductance 12 of the oscillator circuit transfers energy to and starts the last named circuit oscillating. The next pulse takes place before the oscillations created by the first pulse have ceased and are initiated in proper phase relation with said oscillations by means of the inductive relation of the coils 17, 18 and the resistances 19, 20 and the action of the respective circuits so as to augment the accumulated energy in the circuit 12, 14, 15, 16. The next succeeding impulse adds to the accumulation in the same manner as the second and the operation is successively repeated until the full capacity of the oscillating circuit is reached. Thereafter, I have found, that the rate of dissipation of the stored energy of the oscillatory circuit corresponds practically to the rate of supply from the pulsator circuit.

The discharge time or the duration of the pulse of the pulsator for the capacity 11 is controlled by inductance 10 and its interlinkage with the inductance 12. The time of the starting of the pulse is controlled particularly by the conductors 6 and 7 and their respective circuits, although materially affected by the various electrical factors of the whole system.

The coils 17 and 18 are in inductive relation to the oscillatory circuit 12, 13, 14, 15 and 16 through the relation of the inductance 12 to inductances 10, 17 and 18.

The time of the pulse, the phase relation of starting of the pulse with relation to the oscillations in the oscillatory circuit and the duration of the pulse are controlled by the electrical factors of these various circuits and their mutual interlinkage and influence. By suitable adjustment the oscillatory circuit may be caused to accumulate and continuously retain many times the energy which is being supplied to and radiated from or consumed within it.

The chief factors for starting the pulse at the proper time with relation to the oscillations in the oscillatory circuit are the coils 17 and 18 interlinked with the oscillatory circuit by means of the inductance coil 12, and the adjustment of the variable resistances 19 and 20 in their respective circuits and the mutual interlinkage and the number of turns of the coils 10 and 12. This permits of delivering the proper amount of current to the conductors 6 and 7 at the right time and with the proper phase relation to the current in the oscillatory circuit.

The circuit 4, 11, 10 and 9 by reason of its capacity and inductance is commensurate with the oscillatory circuit 12, 13, 14, 15, 16 as to natural time period and may have a shorter time period, the same time period, or a longer time period, but must be adjusted for any particular system and arrangement to the right relation.

In any definite natural time relation of the two circuits the ratio of capacity to inductance in one circuit need not necessarily be the same as in the other circuit and there will be a best capacity and inductance relation between the two circuits for a particular system and apparatus. By the arrangement of circuits shown, the pulsator circuit may be caused to supply energy to the oscillatory circuit at such a time and with such phase relation as to pass energy over to the oscillatory circuit and to cause it to be received by the oscillatory circuit even though the latter has stored in it more energy than the energy being supplied from the supplying circuit.

Depending on the electrical and energy relations of the two circuits and the degree of couple between them the pulsator circuit may lead the oscillator circuit by various degrees of phase and a 90° lead works well with an adjusted loose couple. These circuits may be made to operate at any degree of phase and any degree of phase may become useful for this purpose.

In the drawing I have shown switches, 21 and 22, which are useful for cutting out the coils 17 and 18, respectively, when adjusting the pulsator connections. Part 14 may be a resistance or an inductance and in the latter case may act as the primary of another circuit from which the energy may be utilized. Additional resistance may be included in the supply circuit, when desired.

The oscillatory circuit 12, 13, 14, 15 and 16 is shown in Figure 1$^a$ as being operatively related to a load circuit, the coil 14 serving as the primary and the coil 23 serving as the secondary of a transformer and working apparatus 24, 25 and 26 being connected with the coil 23.

In Figure 2, the closed oscillatory circuit 12, 13, 14, 15 and 16 is replaced by an aerial, 27. In this instance the coil affected by the primary 10, as shown in Figure 1, is replaced by a secondary, 28, while a second control coil, 29, is in inductive relation with the coils 17 and 18. However, inasmuch as coil 29 is affected by the same impulses as the coil 28, the oscillatory circuit is controlled in substantially the same manner in this embodiment of my invention as in the embodiment illustrated in Figure 1. In order to set forth for those skilled in the art a system, among others, to which my invention may be applied, I give the following set of values which has been operated successfully under the conditions of my invention, speech having been transmitted to a receiving station.

The ammeter A in the line circuit showed a value of .75 amperes. The average voltage across the tube indicated by the voltmeter V has 500 volts. The condenser circuit current shown by ammeter HA was 1.45 amperes, and the aerial current shown by ammeter $HA_1$ was 3.7 amperes. The keep-alive current shown by ammeter $A_1$ was 3.5 amperes. The following values are given for the constants of the circuits. Capacity 11, .006 microfarads, inductance 10, .000685 henries; inductance 28, .0022 henries; inductance 29, .0024 henries; inductance of aerial, .0003; capacity of aerial, .0013 microfarads. The radiation and Joulean resistance of the aerial was 22 ohms.

The control coils 18 and 17 each had 900 turns with a mean diameter of 6 inches. The resistance in the control circuit to the control electrode next the positive and to the control electrode next the negative was in each instance 50,000 ohms. It will be understood that other values might be employed in carrying out my invention provided the proper relations of interlinkage were first determined and made use of.

The tubes 6 and 7 may be connected by means of the secondary 30 of an induction coil, the primary 31 being connected with and forming part of a circuit containing a source of variation, 32, here shown as a microphone and a source of direct current 33, here shown as a battery. This circuit causes electric variations to be impressed on the tubes 6 and 7 by means of the secondary 30. A condenser, 34, may be used in the secondary circuit, if desired. The microphone circuit is shown as an example, though other sources of variation may be employed.

I claim as my invention:

1. In a system of converting and utilizing electrical energy, the method of accumulating and maintaining accumulated energy in an oscillating circuit, which consists in continuously developing energy in a primary system and transforming it into uni-directional energy pulses, continuously transferring this energy to a second system capable of accumulating oscillating energy, and controlling the transfer of energy from the first system to the second system by the accumulating system to cause the energy pulses to occur in such phase relation to the oscillations in the accumulating system that the maximum amount of energy is delivered at each pulse from the primary system to the accumulating system.

2. In a system of converting and utilizing electrical energy, the method of accumulating and maintaining accumulated energy in an oscillating circuit, which consists in applying to the oscillatory circuit intermittent uni-directional pulses of electrical energy from a primary system and controlling the transfer of energy from the primary system to the oscillatory system by the oscillatory system to cause the energy pulses to occur in such phase relation to the oscillations in the oscillatory system that the maximum amount of energy is delivered at each pulse from the primary system to the oscillatory system.

3. In a system of converting and utilizing electrical energy, the method of accumulating and maintaining accumulated energy in an oscillating circuit, which consists in applying to the oscillatory circuit the energy of pulses of current of only one direction from a primary system and controlling the transfer of energy from the primary system to the oscillatory system by the oscillatory system to cause the energy pulses to occur in such phase relation to the oscillations in the oscillatory system that the maximum amount of energy is delivered at each pulse from the primary system to the oscillatory system.

4. A system of electrical distribution, comprising a source of electric current, an electric pulsator for producing intermittent or pulse current in only one direction, a second circuit, transformers for delivering the energy of the pulses to the second circuit, and control means responsive to energy variations in the second circuit for timing the pulses of the pulsator circuit so that energy will accumulate in the second circuit, and for thereafter causing the second circuit to accept and dissipate the energy of each impulse of the first circuit.

5. A system of electrical distribution, comprising a source of electric current, an electric pulsator for producing intermittent or pulse current in only one direction, a second circuit, transformers for delivering the energy of the pulses to the second circuit, control means responsive to energy variations in the second circuit for timing the pulses of the pulsator circuit so that energy will accumulate in the second circuit, and for thereafter causing the second circuit to accept and dissipate the energy of each impulse of the first circuit, and means for impressing variations on the pulsator circuit.

6. The combination of a source of electric currents, a pulsator for producing electric impulses in only one direction, an oscillating circuit inductively related to the pulsating circuit, and controlling inductive devices and circuit connections inductively interlinking the pulsator circuit with the oscillator circuit.

7. The method of converting and utilizing electrical energy, which consists in applying to an oscillatory system uni-directional pulses of electrical energy in a primary system and varying the amount of energy radiated by the oscillatory system by changing the phase relation of the pulses to the current in the oscillatory system.

8. A system of electrical distribution comprising a source of electric current, an intermittently conducting electric pulsator for producing intermittent or pulse current in only one direction, a second circuit connected to the secondary of a transformer, the primary of which is in the circuit of the pulsator and control coils in the primary circuit affected by the said transformer secondary for governing the operation of the pulsator.

Signed at New York, in the county of New York and State of New York, this 28th day of October, A. D. 1915.

PETER COOPER HEWITT.

Witnesses:
R. A. HEWITT,
WALTER E. F. BRADLEY